United States Patent [19]

Mathewes

[11] Patent Number: 4,737,062
[45] Date of Patent: Apr. 12, 1988

[54] APPARATUS FOR THE CONTROLLED REMOVAL OF FLOWABLE BULK MATERIAL AT THE UNDERSIDE OF A BULK-MATERIAL COLUMN, ESPECIALLY A MIGRATING-BED FILTER

[75] Inventor: Wolfgang Mathewes, Giessen, Fed. Rep. of Germany

[73] Assignee: Siemens Aktiengesellschaft, Berlin and Munich, Fed. Rep. of Germany

[21] Appl. No.: 928,523

[22] Filed: Nov. 7, 1986

[30] Foreign Application Priority Data

Nov. 9, 1985 [DE] Fed. Rep. of Germany ....... 3539829
Apr. 9, 1986 [DE] Fed. Rep. of Germany ....... 3611953
Aug. 20, 1986 [DE] Fed. Rep. of Germany ....... 3628205

[51] Int. Cl.[4] ............................................ B01D 53/08
[52] U.S. Cl. .................................... 414/288; 414/216;
414/328; 414/299; 222/361; 366/193
[58] Field of Search ............... 414/221, 268, 288, 303,
414/304, 319, 299, 321, 328, 217, 216, 414;
222/361; 366/184, 193

[56] References Cited

U.S. PATENT DOCUMENTS

2,433,054 12/1947 Lime .................................... 222/361
4,072,251 2/1978 Huang ............................. 222/361 X

FOREIGN PATENT DOCUMENTS

510624 3/1955 Canada .................................. 222/361
64046 8/1892 Fed. Rep. of Germany ...... 414/288
2625275 3/1979 Fed. Rep. of Germany .
3406413 8/1985 Fed. Rep. of Germany .
847768 10/1939 France .
99697 11/1961 Niger .
2116869 10/1983 United Kingdom .
2146309 4/1985 United Kingdom ................ 222/361

Primary Examiner—Robert J. Spar
Assistant Examiner—Vien Nguyen
Attorney, Agent, or Firm—Herbert L. Lerner; Laurence A. Greenberg

[57] ABSTRACT

An apparatus for removing flowable bulk material from the underside of a bulk-material column includes a container for bulk material conducting gaseous or vaporous media to be scrubbed upward through the column opposite the bulk-material flow for eliminating used filter material; a stationary grating below and spaced from the underside of the column including spaced-apart grid chambers; a first control grate above the grating, spaced from the underside of the column, covering the surface area of the grating, including alternating passage openings and blocking sections corresponding to the spacing of the grid chambers and being displaceable in a first horizontal stroke direction; and a second control grate below the grating, including passage openings and blocking sections and being displaceable axially parallel to the first stroke direction; the passage openings and blocking sections of the first and second control grates being mutually horizontally adjustable for alternately filling a first group of the grid chambers with bulk material through the passage openings of the first control grate and blocking the first group with blocking sections of the second control grate preventing deposits of bulk material from trickling down, and covering a second group of the grid chambers following the first group with the blocking sections of the first control grate preventing the second group from receiving bulk material and opening the second group of grid chambers with the passage openings of the second control grate for emptying deposits of bulk material.

18 Claims, 11 Drawing Sheets

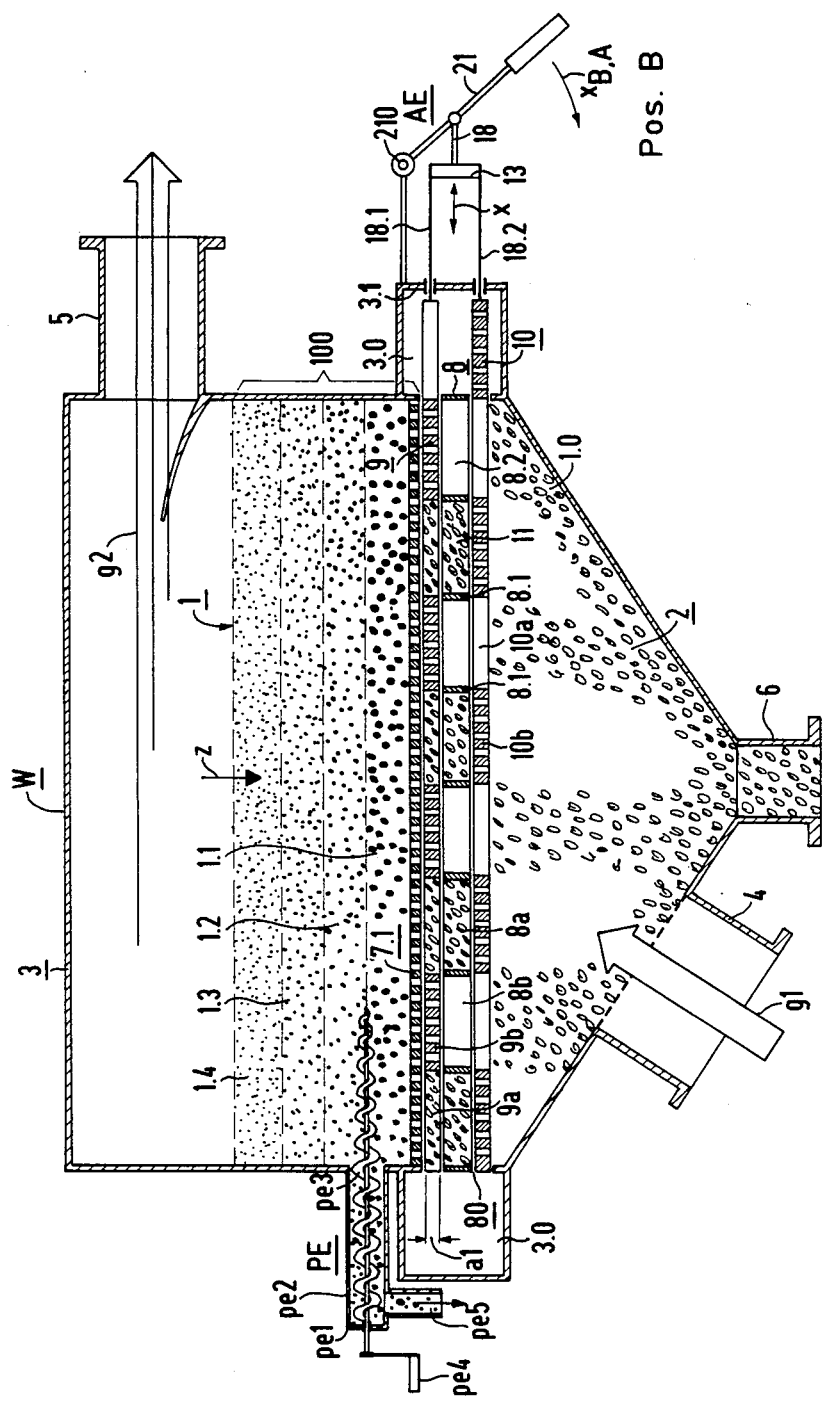

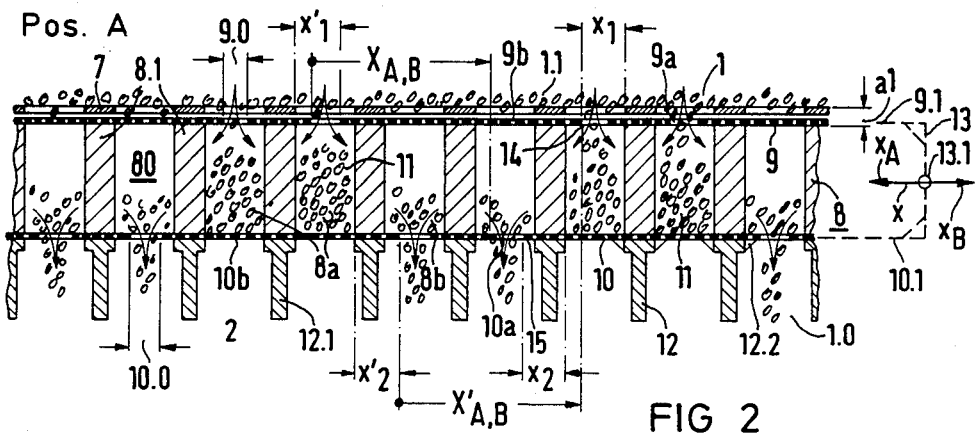
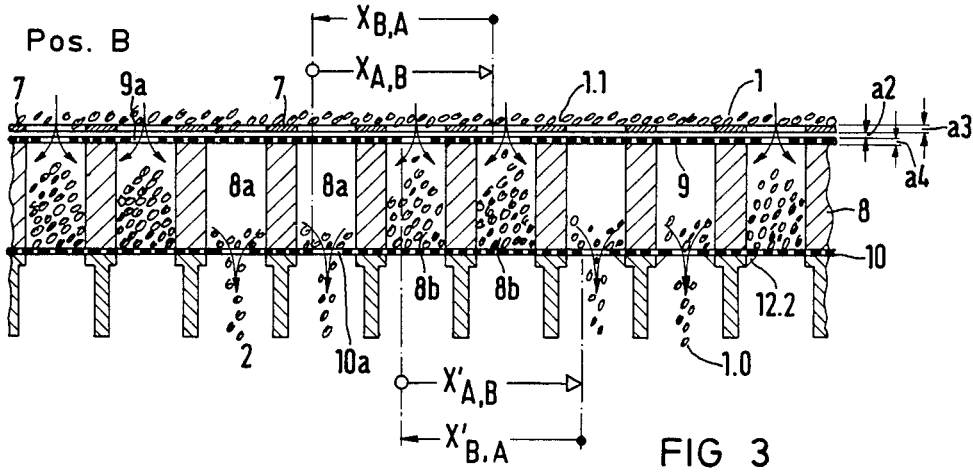
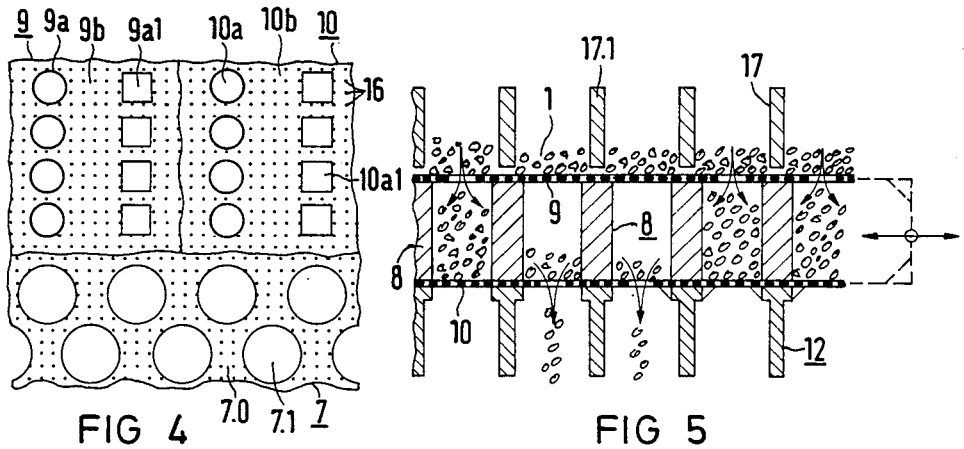

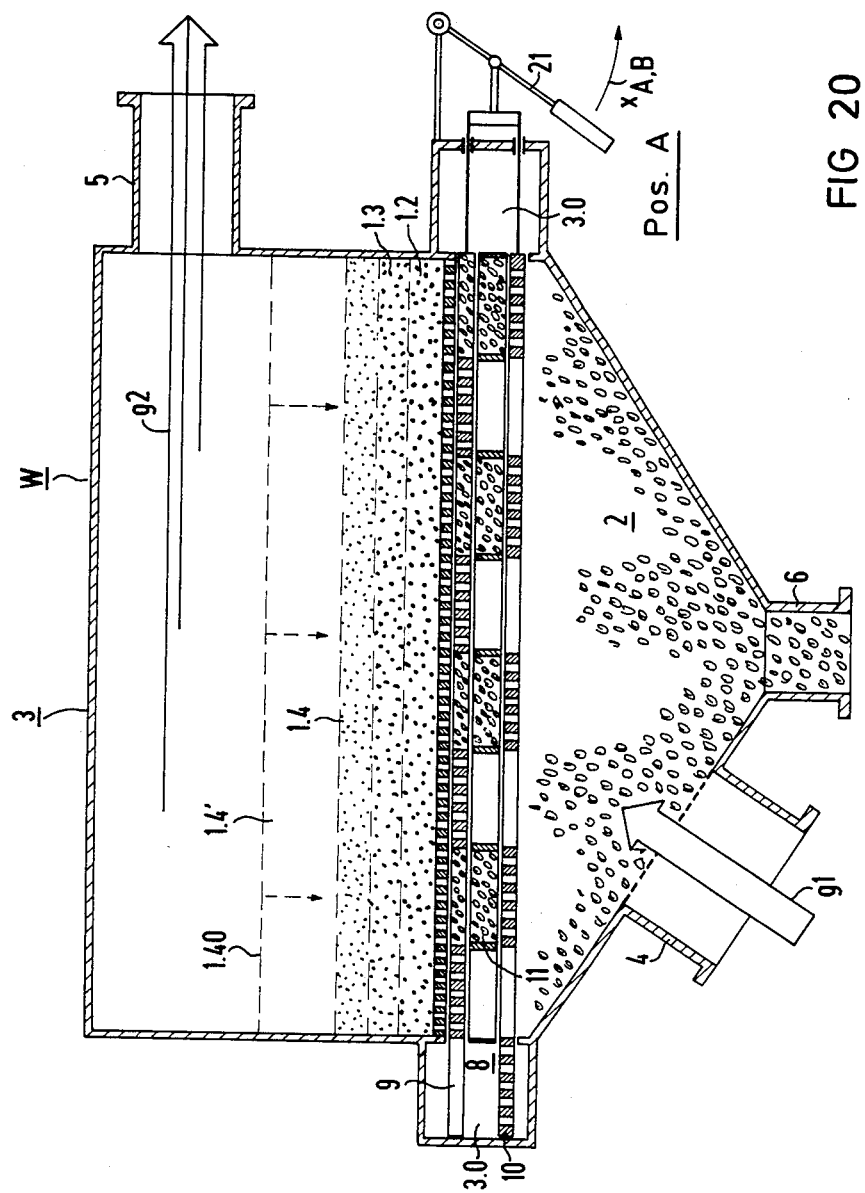

APPARATUS FOR THE CONTROLLED REMOVAL OF FLOWABLE BULK MATERIAL AT THE UNDERSIDE OF A BULK-MATERIAL COLUMN, ESPECIALLY A MIGRATING-BED FILTER

BACKGROUND OF THE INVENTION

1. Field of the Invention:

The invention relates to an apparatus for the controlled removal of flowable bulk material at the underside of a bulk-material column located in a container, in as parallel a plane as possible, especially with a migrating-bed filter for eliminating used filter material in the course of scrubbing gaseous or vaporous media, the filter material or bulk-material column having a flow of such media therethrough from bottom to top in a direction opposite to the direction of flow of the bulk material.

2. Description of the Related Art:

A particular problem in an apparatus of this generic type is how to remove the bulk material or filter material in a plane-parallel manner, without forming preferential flow zones for the gases or vapors flowing in at the bottom that create hollow spaces in the lower area of the bulk-material column or migrating-bed filter. A further problem is how to construct the apparatus so that a metered trickling-down process which acts as a reciprocating or piston flow, causes the plane-parallel removal of the filter material, without jamming throughput adjusting devices on the underside of the column and without requiring special and costly provisions for sealing.

Migrating-bed filters for cleaning gaseous or vaporous media, to which the invention preferably relates, are more particularly adsorption filters, in the form of so-called activated carbon filters, which play a particularly important role in the decontamination of exhaust air in nuclear engineering facilities, such as nuclear research laboratories or nuclear power plants. For example, reference should be made to German Patent No. DE-PS 26 25 275. The most important goal is to filter out radioactive iodine and to remove gaseous hydrocarbons from the air exhausted from buildings; the activated carbon filters cooperate with high-efficiency submicron particulate filters. In activated carbon filters, the bulk-material column is in the form of the filter bed of the activated carbon bodies. For instance, these may be cylindrical bodies from 1 to 2 mm in diameter and 1.2 to 2 mm in length which are made from extruded coal, or they may be in the form of "broken particles" having a particle size of from 1 to 2 mm. The activated carbon filters are also known as iodine sorption filters of the migrating-bed filter type. German Published, Non-Prosecuted Application No. DE-OS 34 06 413 describes an apparatus of this generic type, with which an attempt has been made to address the above-described problem; however, it has been found that the pyramid-shaped flow guide devices therein, which have lateral surfaces ending in gutter-like trickle-down openings at the bottom of the bulk-material column, do not permit a homogenous bottom to top flow of the gases or vapors that are to be cleaned through the column. It has also been found that because of the grating thereof which is moved back and forth along with its deposits of bulk material located in chambers in the grating, the activated carbon undergoes additional shear stress in the vicinity of the trickle-down openings.

These disadvantages also arise in an apparatus described in Netherlands Published, Prosecuted Application No. 99 697.

SUMMARY OF THE INVENTION

It is accordingly an object of the invention to provide an apparatus for the controlled removal of flowable bulk material at the underside of a bulk-material column, especially a migrating-bed filter, which overcomes the hereinafore-mentioned disadvantages of the heretofore-known devices of this general type because of the following actions:

attaining accurate control of the trickling down of the bulk material at the underside of the bulk-material column in general and acurate control of the filter material in particular, while enabling a "reciprocating or piston flow";

avoiding preferential flow zones with hollow spaces at the underside of the column, which prevents the bulk or filter material particles that become turbulent in the hollow spaces and the adjoining filter or bulk material zones from being exhausted to different extents; and providing the apparatus with a sturdy and nevertheless precise throughput adjustment device, with accurate metering.

With the foregoing and other objects in view there is provided, in accordance with the invention, an apparatus for the controlled removal of flowable bulk material in as plane-parallel a manner as possible from the underside of a bulk-material column, comprising:

a container, especially a migrating-bed filter through which bulk-material deposits of the bulk-material column flow in a given flow direction, the container including means for conducting gaseous or vaporous media to be scrubbed through the bulk-material column substantially from bottom to top in a direction substantially opposite to the given direction for eliminating used filter material;

a stationary grating or lattice grate having a surface area being substantially the same as that of the bulk-material column and being disposed below and spaced from the underside of the bulk-material column, the grating including upper and lower surfaces and grid chambers spaced apart by a given spacing in a horizontal sequence, the grid chambers being disposed in first and second groups;

a first control grate disposed on the upper surface of the grating at a distance from the underside of the bulk-material column, the first control grating covering the surface area of the grating and including alternating passage openings and blocking sections corresponding to the given spacing of the grid chambers, means for supporting the first control grate so as to be displaceable in a first horizontal stroke direction;

a second control grate disposed on the lower surface of the grating and including passage openings and blocking sections, means for supporting the second control grate so as to be displaceable axially parallel to the first horizontal stroke direction; and means for horizontally moving the passage openings and blocking sections of the first and second control grates for alternately:

filling the first group of the grid chambers of the grating with bulk material through the passage openings of the first control grate and blocking the undersides of the first group of the grid chambers with the blocking sections of the second control grate preventing deposits of bulk material therein from trickling down, and covering the second group of the grid chambers following the first group of grid chambers with the blocking sections of the first control grate preventing the second group of grid chambers from receiving bulk material and opening the second group of grid chambers with the passage openings of the second control grate for emptying deposits of bulk material therein.

The advantages attainable with the invention are, above all, the following:

(1) The air velocity, or in general the velocity of the gases or vapors that are to be introduced from the bottom, can be increased over that of a migrating-bed filter having pyramid-shaped guide elements. Values of 0.4 m/s have been measured, by comparison with the prior art air velocity of approximately 0.3 m/s. Because of the improved introduction of air or gases or vapors in general, hollow spaces are not formed inside the bulk-material column or activated carbon adsorber bed until velocities of greater than 0.45 m/s are attained. The adsorber can therefore have smaller outer dimensions, for a given filter output.

(2) A preferential flow of air or gas in the activated carbon bed cannot arise, because the underside of the bulk-material column is reinforced with flat grate or lattice structures and all the vertical distances are of equal length from these flat structures to the top of the column. Since pyramidal guide elements are omitted from the lower portion of the column, so-called waves of contamination are prevented from forming in the column in general and in the layer of activated carbon bodies in particular.

(3) The removal of bulk material (or activated carbon) with the aid of the apparatus according to the invention is effected in a plane-parallel manner, because:

(a) the removal is by volume, with defined deposits of bulk material, so that free trickling is impossible; and (b) during the removal process, individual bodies or particles do not travel different distances in the activated carbon bed (or in the filter bed in general). Virtually only a vertical flow direction is possible, while crosswise movement by the activated carbon particles is impossible.

(4) Relatively low frictional forces arise in the movement of the control grate, since friction only occurs between the grate surfaces, that is the metal surfaces, and the carbon particles.

(5) The control grates are preferably manufactured from special steel sheets having a thickness of approximately 1 mm, which also have uniformly distributed smaller holes in addition to the flow openings, that are gas-permeable but are not permeable to the particles. The grating is also preferably manufactured from special steel sheets. The same applies to the guide grate on the underside of the bulk-material column, if one is used. If it is used, then a spacing interstice is suitably left between the underside of the guide grate and the top of the upper control grate; the size of this interstice may be approximately that of from one-half to several particles, and it contributes to a uniform distribution and introduction of air.

(6) Very generally, the relatively low flow resistance of the apparatus with respect to the gases or vapors that are to be introduced from below must be emphasized; this results in a low pressure loss, and enables the high "air velocities" mentioned above in paragraph 1.

Other features which are considered as characteristic for the invention are set forth in the appended claims.

Although the invention is illustrated and described herein as embodied in an apparatus for the controlled removal of flowable bulk material at the underside of a bulk material column, especially a migrating-bed filter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is an overall diagrammatic, vertical-sectional view of an apparatus according to the invention, in the form of an iodine sorption filter for nuclear power plants having activated carbon bodies as its filter material, and a guide grate above a configuration referred to as "first control grate-grating-second control grate";

FIG. 2 is a fragmentary, cross-sectional view of a second embodiment of the "first control grate-grating-second control grate" configuration, having a guide grate on the top and a supporting grate on the underside, and showing one end position A of the two control grates with respect to the grating located therebetween;

FIG. 3 is a view of the device shown in FIG. 2, but in an end position B of the two control grates, which have been displaced to the right by a stroke distance, as compared with the position A of FIG. 2;

FIG. 4 is a fragmentary top-plan view of upper and lower control grates and the guide grate, showing two versions of the flow openings (round and rectangular openings);

FIG. 5 is a fragmentary, cross-sectional view of an embodiment of the apparatus which is basically similar to FIGS. 2-4, but with the difference that only a guide grate with grate strips standing on edge is provided, instead of the guide grating on the underside of the bulk-material column;

FIG. 20 is a reduced view of the apparatus shown in FIG. 1, in the other end position of its two control grates.

DESCRIPTION OF THE PREFERRED EMBODIMENTS

Figure 6:
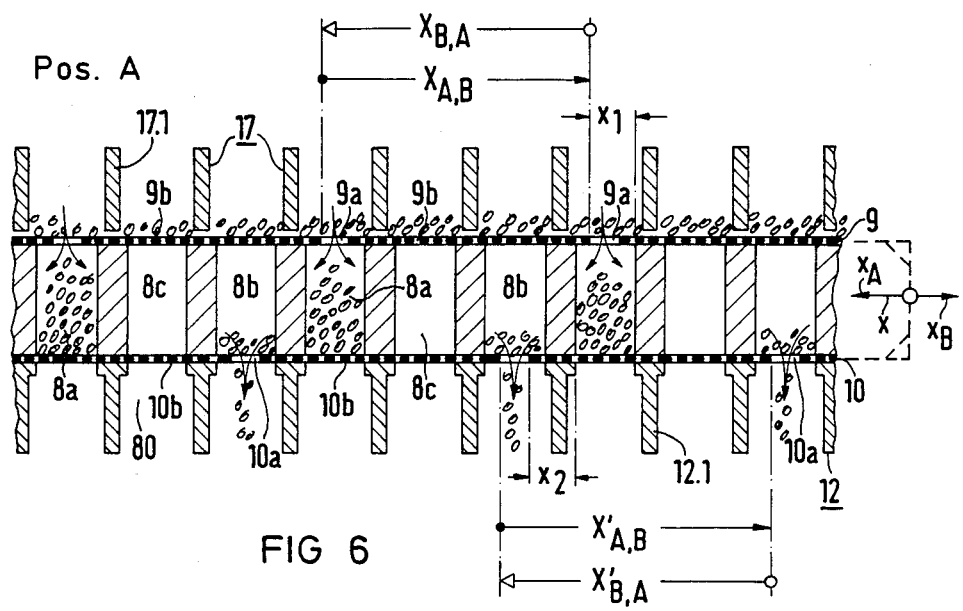
FIG. 6 is a view similar to FIG. 2 of a fourth embodiment of the apparatus, which is basically constructed similar to the apparatus shown in FIG. 5, but with the difference that intermediate grate chambers are also interposed between grate or grid chambers of a first and a second group.

Referring now to the Figures of the drawings in detail and first, particularly, to FIG. 1 thereof, there is seen a diagrammatic, overall cross-sectional view of the apparatus according to the invention for the controlled removal of flowable bulk material 1 in as plane-parallel a manner as possible from the lower surface or underside 2 of a bulk-material column 100 disposed in a container 3. The apparatus shown is in particular part of a migrating-bed filter for draining used filter material 1.0 (trickling down material) and 1.1 (lowermost layer of the bulk-material column 100). The bulk-material column 100 will simply be referred to below as the filter bed, so that the same term is consistently used. The migrating-bed filter identified as a whole by reference symbol W serves for scrubbing gaseous or vaporous media. In the preferred application, this may be exhaust air from nuclear engineering facilities, which have to be suitably scrubbed before they flow to an exhaust-air stack. The particular requirement in this case is to retain the radioactive iodine, which is why the apparatus is also called an iodine sorption filter of the migrating-bed filter type. Gases or vapors flowing through inlet pipes 4 are indicated by an arrow given reference symbol g1; the gases or vapors flow through the filter bed 100 from below, in a countercurrent to the flow direction of the bulk material 1, during the course of which the contaminations contained in the gases or vapors are absorbed by the bulk material 1 (especially grains of activated carbon). The scrubbed gases or vapors leave the container 3 through an outlet pipe 5 as indicated by flow arrows g2. The container 3 has a wall of stainless steel and an especially rectangular cross section; the wall is tapered at its lower end in conical or frustoconical fashion and terminates in an outlet pipe 6 for the bulk material 1. Non-illustrated flow adjusting devices may be associated with the outlet pipe and similarly, bulk-material distributing devices shown in FIG. 11 may be associated with the top of the filter bed. The filter bed is shown as having layers indicated by dots of varying sizes and layer boundaries drawn in broken lines, in order to represent the varying content therein of the substances that are to be retained. The lowermost layer 1.1 has the highest content or loading of such substances, the layer 1.2 above it has a somewhat lesser content, the layer 1.3 has still less, and the uppermost layer 1.4 is a layer of fresh bulk material, which has practically not yet been loaded at all. Intermittently, the lowermost layer 1.1 does not trickle down and is refilled with a fresh layer on the top of the filter bed 100, so that the height of the filter bed 100 and thus the filtering quality remain unchanged.

In order to support the filter bed 100, a substantially flat guide grating 7, in the form of a perforated plate or the like, is disposed on the underside of the filter bed, forming, so to speak, the lower limiting surface or limiting line of the lowermost layer 1.1. On one hand, openings formed in the guide grating 7 which are distributed over the surface area of the filter bed 100, serve to allow the bulk material 1 to trickle down and on the other hand, they admit the gaseous or vaporous media g1 flowing in from below. A stationary grating 8 formed of intersecting lattice bars 8.1 (lengthwise bars) and 8.2 (crosswise bars) standing on edge, is disposed below the guide grating 7 and is spaced apart from the guide grating 7 by a distance a1. Various small grate or grid chambers with a rectangular or square layout, are formed by means of the intersecting lattice bars 8.1, 8.2. Grate or grid chambers 80 of a first group 8a and a second group 8b are formed.

A first control grate 9 is provided on top of the grating 8 in the spacing a1 between the grating 8 and the underside or lower surface of the filter bed 100, which covers the surface area of the guide grating 7 and the stationary grating 8 and is supported in such a way that it is displaceable in a horizontal direction x. The first control grate 9 is provided with alternating passage openings 9a and blocking fields or sections 9b that correspond to the spacing of the grating.

A second control grate 10, which is also supported in such a way that it is horizontally displaceable, is disposed on the underside of the grating 8. The second control grate 10 has passage openings 10a and blocking fields or sections 10b which are horizontally controlled and are disposed in such a way with respect to those of the first control grate 9, that the first group 8a of the grate or grid chambers 80 of the grating are filled with bulk material 1 through the passage openings 9a of the first control grate 9 and are blocked at the underside thereof by the blocking fields or sections 10b of the second control grate 10, which prevents their deposits of bulk material from trickling down. On the other hand, the second group 8b of grate or grid chambers 80 are each adjacent those of the first group 8a of grate or grid chambers 80 and are covered by the blocking fields or sections 9b of the first control grate 9, so that they are prevented from receiving bulk material 1 but are opened by the passage openings 10a of the second control grate 10 so that they can empty their deposit of bulk material, and vice versa.

The first and second control grates 9 and 10 can each be associated with an adjusting device, so that the two control grates can be controlled independently of one another in a very specific relationship and order and so that the adjacent groups 8a, 8b of grate or grid chambers 80 alternatingly fill and empty. However, it is particularly advantageous if the two control grates 9, 10 are offset from one another as shown, are rigidly coupled to one another and are then moved back and forth by a drive apparatus AE as indicated by the arrow x. The result is a particularly simple structure, with sturdy control means. In this case, as viewed in the projection indicated by the flow direction z of the bulk material 1, the blocking fields or sections 9b of the first control grate 9 are located in the surface region of the passage openings 10a of the second control grate 10, and the passage openings 9a of the first control grate 9 correspondingly are located in the surface region of the blocking fields or sections 10b of the second control grate 10. In this relationship, the first and second control grates 9, 10 are rigidly coupled to one another and are supported in such a way that they are movable back and forth in common in the horizontal direction x, so that upon the horizontal movement of the two control grates 9, 10, the adjacent first and second groups 8a, 8b of grate or grid chambers 80 are alternately either filled from the top with bulk material 1 or emptied at the bottom of bulk material or deposits 11 of bulk material.

Metal sheets for the control grates 9, 10 and the lattice bars 8.1, 8.2 of the grating 8 as well as for the guide grating 7, are preferably formed of stainless steel. Except for the openings 9a, 10a and 7.1 seen in FIG. 4, the sheets for the control and guide grates 9, 10, 7 are impermeable to particles, but are permeable to gases because of perforations 16, 7.0. The drive apparatus AE for the control grates 9, 10 has two thrust bolts 18.1, 18.2, each being connected to one control grate 9, 10, each passing through a side wall 3.1 of the container in a sealed manner and each being pivotably connected through a crossbar 13 and thrust bar 18 with a drive crank 21 at reference numeral 21.0. The drive crank is supported on a pivot bearing 210 that is integral with the housing.

Reference symbol PE indicates a sampling device having a conically tapered removal worm pe1, which is supported in a sealed and rotatable manner in a worm housing pe2 and which protrudes through a removal opening pe3 into the filter bed 100. When a crank pe4 turns, a small quantity of filter material is removed and delivered through a removal tube pe5 to a non-illustrated sample container. In this way, the loading or charging state or the content of filtered contaminants of the filter material can be monitored.

Lateral housing pockets 3.0 form open spaces which permit back-and-forth movement of the control grates 9, 10 in the direction x, as also seen in FIG. 20. If the location of the control grates 9, 10 in FIG. 1 is called "position B", then in FIG. 20 they have been displaced into the other end position A by a stroke $x_{B,A}$, by pivoting the drive crank 21 clockwise. Starting from the position A, the control grates 9, 10 return to the position B shown in FIG.1, if the drive crank is pivoted counterclockwise for generating a stroke $x_{A,B}$. It is also clear from FIG. 20 that the first group 8a of grate or grid chambers 80, that are filled in FIG. 1, has become the second group 8b, so that these chambers have been emptied of their deposits 11 of bulk material. In FIG. 20, the lowermost layer 1.1 of FIG. 1 has reached the first group 8a of grate or grid chambers 80, and the other layers 1.2, 1.3 and 1.4 have slid down after it, so that the space indicated by reference numeral 1.4' (the space originally occupied by the layer 1.4) must be refilled with new activated carbon up to a level marking line 1.40. The filling apparatus required for this task is not shown in FIGS. 1 and 20, but a suitable embodiment 26 thereof can be seen in FIG. 11.

The guide grating 7 is more clearly visible in FIG. 2 than in FIG. 1. The guide grating 7 is shown in the top-plan view of FIG. 4 with a field of uniformly distributed large, circular, trickle-down openings 7.1 and small openings or perforations 7.0 indicated by dots, which are air-permeable but are not permeable to particles. The grate or grid chambers are generally identified by reference numeral 80 in FIG. 2 and in subsequent figures. As noted above, the spacing a1 is between the underside of the filter bed 100 and the top of the grating 8. The following equation applies: $a1 = a2 + a3 + a4$, where a3 is the wall thickness of the guide grating 7, a4 is the wall thickness of the control grate, and a2 is the play or the air gap between the elements 9 and 7. The air gap a2 may amount to from one to several millimeters, that is, up to the size of one or more particles; because of the structural height of the container, the air gap a2 will more likely be smaller rather than larger. The second (lower) control grate 10, together with the deposit 11 of bulk material located thereon, is supported on a supporting grate 12 and is guided thereon in the stroke direction x. The x direction is the main direction; the directional arrow pointing to the right is indicated by reference symbol $x_B$, and the direction pointing to the left is represented by reference symbol $x_A$.

It is diagrammatically indicated that respective control grate extensions 9.1 and 10.1 are rigidly connected with a crossbar and a thrust rod can engage a force application point 13.1 of the crossbar, as already explained in conjunction with FIG. 1.

The spacing of individual lattice bars 12.1 of the supporting grate 12 in the stroke direction x corresponds to the spacing of the individual lattice bars 8.1 of the grating 8. The control grates 9, 10 are preferably made of special steel plate having a thickness of 1 to 2 mm; the passage openings 9a and 10a and the blocking fields or sections 9b and 10b are in a quite specific relationship with the spacing of the grating 8 and of the supporting grate 12, as may be seen in FIGS. 1 and 2. The first control grate 9, along with the bulk material 1 located thereon, is supported on the stationary grating 8 and is guided thereon in the stroke direction x. The result for both control grates 9, 10, is accordingly a field of numerous support lines or support points and precise guidance in the stroke direction x.

Figure 14:
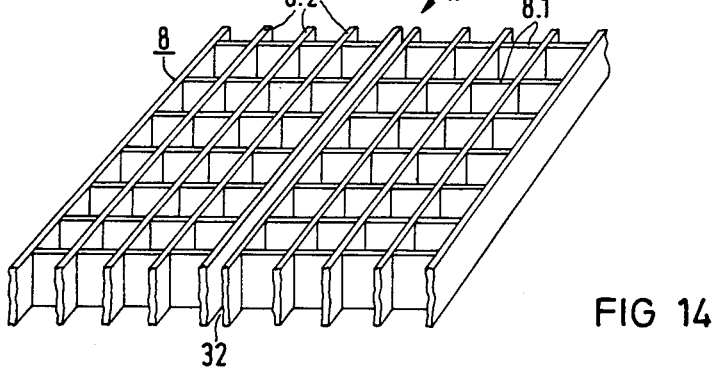
FIG. 14 is a fragmentary perspective view of the grating.

The stationary grating 8 with its lattice bars 8.1 extending transverse to the stroke direction x (the lattice bars extending transverse thereto in the stroke direction, are not shown in FIGS. 2–4) may in principle be made without these lattice bars extending in the stroke direction, in order to provide a simpler construction; however, the stationary grating with intersecting lattice bars, as shown diagrammatically in FIG. 14, has greater stability.

The mode of operation explained in conjunction with FIG. 1 becomes particularly apparent from FIGS. 2 and 3. As an example, FIG. 2 shows one end position A of the two control grates 9, 10. The grate or grid chambers 80 of the first group 8a can then allow material to trickle down into them through the the passage openings 9a in the upper control grate 9 which have a slit or hole width 9.0, so that the deposits 11 of bulk material form therein. At the bottom, the grate or grid chambers of the first group 8a are blocked thereto as viewed in the stroke direction x, the latter chambers being or having been emptied in the end position A of the upper and lower control grates 9, 10. A distance $x_1$ from the back edge of the passage openings of the first or upper control grate 9, which is defined by the partial stroke of a back edge 14 of the opening in the position A seen in FIG. 2 until it coincides with the respective passage opening 9a, is at most equal to, but is preferably smaller than, a distance $x_2$ from the front edge of the passage openings 10a of the second or lower control grate 10, and this front edge distance $x_2$ is defined by the partial stroke $x_2$ of its respective passage opening 10 from the position A until attaining a position in which the same passage opening 10a has not quite yet reached the vicinity of the next grate or grid chamber 80 in succession. The variables $x_1$ and $x_2$ apply for movement in the stroke direction $x_B$, that is, for movement from the position A to the position B. If an opposite stroke is executed, then the variables $x_1'$ and $x_2'$ would apply for the back edge and front edge distances, respectively. The front edge that is definitive for the variable $x_2$ is shown at reference numeral 15 in FIG. 2. The relative distances described herein have importance in the sense that a defined coincidence always prevails during the control process, or in other words, free trickling from the underside of the bulk-material column downward through the grate or grid chambers 80 is impossible; instead, it is only possible for defined bulk-material deposits to flow into the volumes represented by the grate or grid chambers. In the embodiment of FIGS. 2-4, the bars 12.1 of the supporting grate 12, which have the shape of a T-section, may be provided with enlargements 12.2 at the heads thereof, so that even taking the maximum tolerances of the grating 8 and the control grates 9, 10 into account, it is never possible for there to be a "short circuit" for the bulk material 1 leading downward through the grate or grid chambers 80.

FIG. 4 illustrates an advantageous embodiment of the passage openings and blocking fields or sections of the control grates 9, 10, in which the passage openings 9a, 10a in the first and second control grates are uniformly spaced circular openings in mutual alignment and in rows extending transverse to the stroke direction; according to a modification, they may also be in the form of rectangular openings 9a1, 10a1. The blocking fields or sections 9b, 10b and the perforations or air passage openings 16 (shown as dots) are respectively located between the rows.

In FIGS. 2 and 3, the solid black stroke arrows $x_{A,B}$ and $x'_{A,B}$ indicate the stroke to be executed by the first or second control grates 9 or 10, as the case may be, in order to move from position A (FIG. 2) to position B (FIG. 3). The stroke arrow $x_{B,A}$ in FIG. 3 accordingly represents the stroke in the direction $x_A$ that is necessary for the control grates 9, 10 to move from position B to position A. The solid arrows thus represent strokes that are to be executed while on the other hand, the arrows $x_{A,B}$ and $x'_{A,B}$ shown by outlines in FIG. 3 represent the fact that these strokes have already been executed or in other words that they have taken place in the past.

The modification according to the third embodiment shown in FIG. 5 has a guide grate 17 having individual grate strips 17.1 on the bottom of the column of bulk material instead of the guide grating 7 according to FIGS. 1-4. The construction and disposition of the illustrated guide grate 17 is based on the recognition that after all, the bulk-material column 100 can be adequately supported at the underside thereof by means of the fixed elements of the supporting grate 12 and the stationary grating 8 together with the control grates 9, 10 guided thereon, if these elements 8, 12, 9, 10 are constructed in such a way as to be sufficiently stable. The guide grate strips 17.1 therefore no longer have the task of removing the weight of the column of bulk material, but rather merely of preventing transverse movement of the bulk material whenever the upper control grate 9 is moved back and forth. In other words, this makes it possible to assure the desired plane-parallel reciprocating or piston flow, although a coupling between the upper control grate 9 and the particles of bulk material located thereon does occur because of frictional engagement. The guide grate 17 with the grate strips 17.1, is secured in a stationary manner on the container walls, or is combined into a structural unit with the other stationary parts 8 and 12 and this structural unit can then be joined to the container in a fixed manner.

Figure 7:
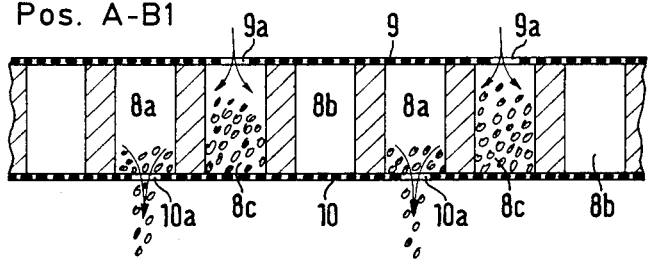
FIG. 7 is view of a portion of FIG. 6, showing the two control grates in a position A-B1 that is somewhat displaced in the stroke direction from the end position A of FIG. 6.
Figure 8:
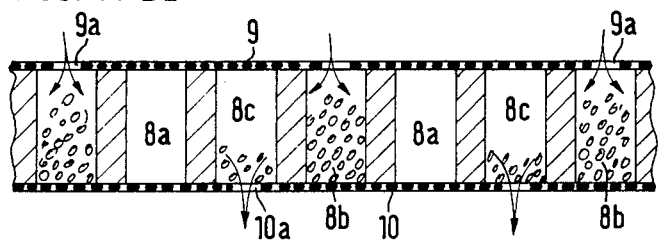
FIG. 8 is a view similar to FIG. 7 showing an intermediate position A-B2 of the two control grates of FIG. 6 that is displaced somewhat farther toward the other end position B.

The structure of the guide grate 17 of FIG. 5 is also used in the fourth embodiment of FIGS. 6-8. In principle, the fourth embodiment of FIGS. 6-8 differs from the third embodiment of FIG. 5 only by the fact that a third group 8c of intermediate grate or grid chambers 8c is disposed between the grate or grid chambers 8a of the first type or first group and the grate or grid chambers 8b of the second type or second group. The third group 8c of intermediate grate or grid chambers 8c is formed by the disposition and mutual association of the passage openings 9a, 10a and the blocking fields or sections 9b, 10b of the two control grates 9, 10. The passage openings 9a of the first control grate 9 are mutually offset or spaced apart by three grate or grid chamber widths and the same is true for the relative locations of the passage openings 10a of the second control grate 10 with respect to one another. However, the control openings 9a of the upper control grate 9 are offset with respect to the passage openings 10a of the second control grate 10 by only one grate or grid chamber width. FIGS. 6-8 show that in the final control grate position A, as viewed in the stroke direction x, each first row of grate or grid chambers 8a of a first group extending transverse to the stroke direction which have been or are being filled, is followed by a second row of intermediate grate or grid chambers 8c, which are covered at the top and bottom by the blocking fields or sections 9b, 10b in the end position A. The further row of grate or grid chambers 8b of the second group, which in the position A are empty or are just now being emptied, only follow the second row of intermediate grate or grid chambers 8c. This is then followed once again, with the same periodicity, by a row of grate or grid chambers 8a of the first group, and so forth. In FIGS. 6-8, the same chambers 8a-8a are shown in mutual alignment from top to bottom. It will be seen that upon the displacement of the control grates 9, 10 in the direction $x_{A,B}$, two intermediate positions, namely A-B1 and A-B2 are traversed, before the position B is reached. This is not shown but in principle it appears the same as that which is shown in FIG. 6. The intermediate grate or grid chambers 8c have an advantage which is that in the grate or grid chambers 8a, 8b between which they are interposed, no particular care need be taken to maintain the back edge spacing $x_1$ and the front edge spacing $x_2$, because $x_1 < x_2$ is already assured in any case. For this reason, it may even be appropriate to interpose further intermediate grate or grid chambers 8c between the grate or grid chambers 8a and 8b which are immediately adjacent one another in FIGS. 6–8, in an alternative which is not illustrated in FIGS. 6–8.

Figure 9:
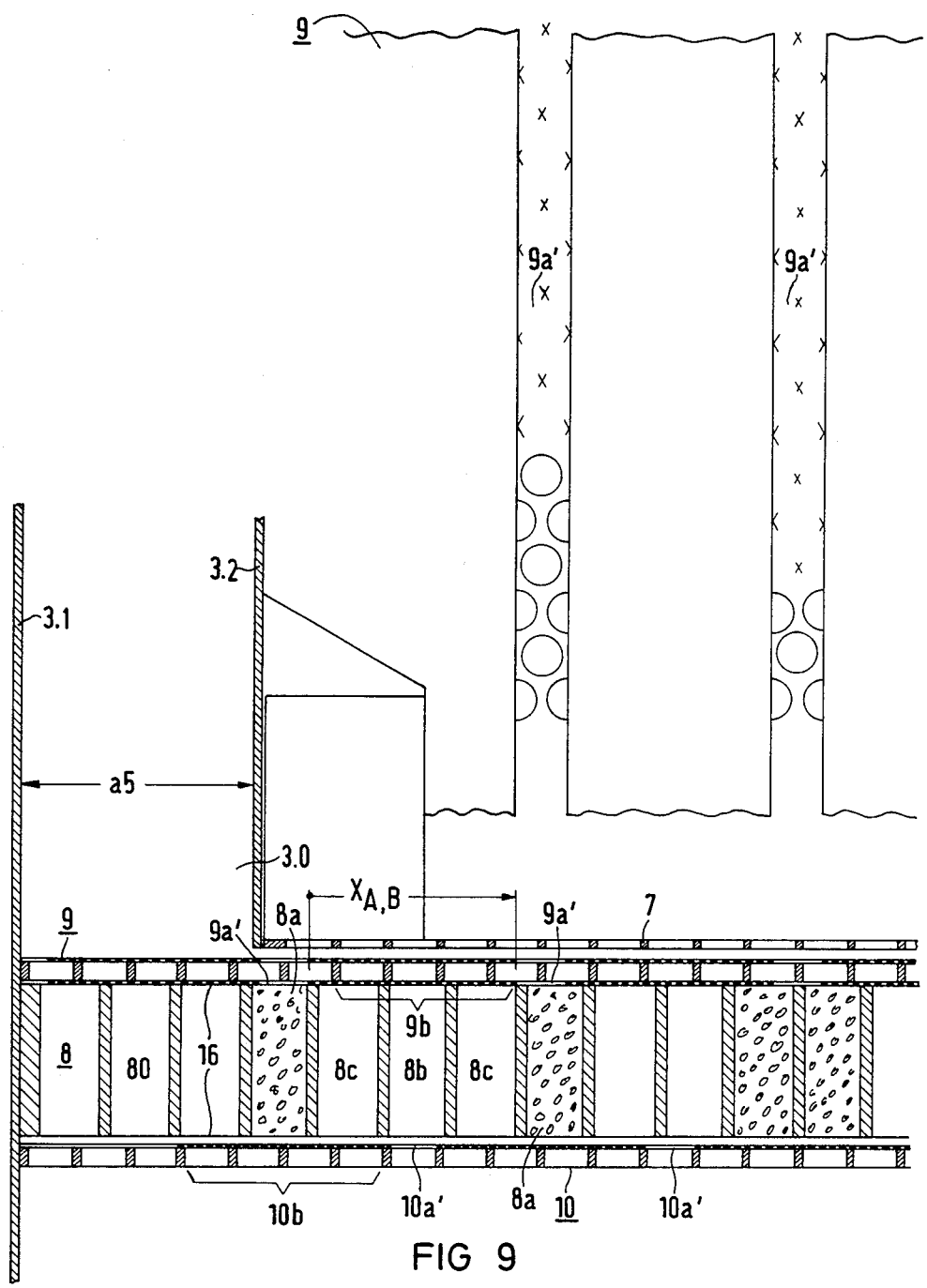
FIG. 9 is a fragmentary, cross-sectional view and an associated fragmentary, horizontal elevational-view showing a fifth embodiment of the apparatus, having control grates with a particularly rigid sandwich construction and having slit-like flow openings, once again with intermediate grate chambers as in the fourth embodiment of FIGS. 6-8, and showing the left-hand end of the apparatus adjacent the container wall.
Figure 10:
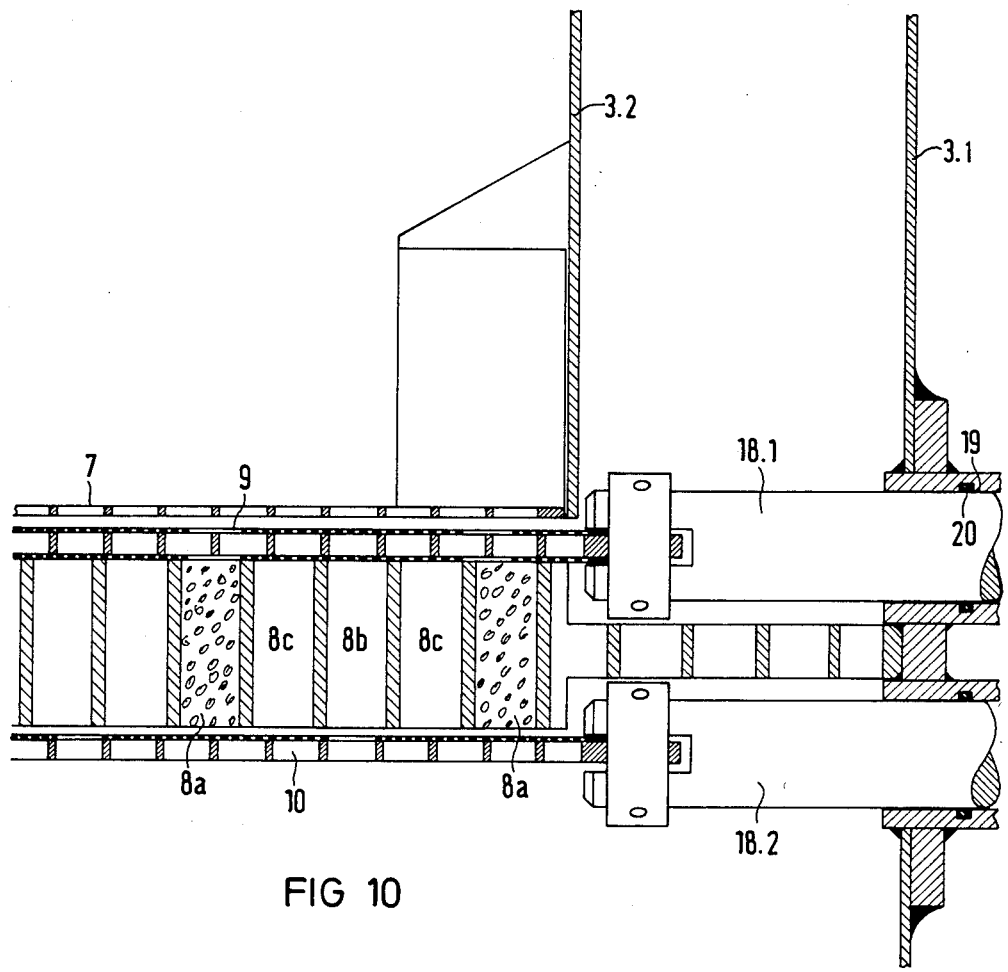
FIG. 10 is a view similar to FIG. 9, showing the right-hand end adjacent the right-hand container wall, in which each of the two control grates is coupled with a respective thrust bolt.

This is practically the case in the fifth embodiment shown in FIGS. 9 and 10, as illustrated by the grate or grid chambers bearing reference numerals 8a–8c therein. The distance from one passage opening 9a' to the next amounts to approximately four grating spacings of the grating 8; the upper row of passage openings 9a' is offset by two grating spacings with respect to the row of lower passage openings 10a', and the stroke $X_{A,B}$ amounts to three grating spacings or four hole spacings, respectively (that is, for the spacing of the passage openings 9a' or 10a', respectively). The passage openings of the first and second control grate 9, 10 are indicated in this case by reference numerals 9a' and 10a', respectively, because they are slit-like in form, as shown. The upper control grate 9 is formed in this case with a sandwich construction and is therefore also suitable as a particularly rigid supporting element; this also applies to the second control grate 10, which is assembled from U-shaped grid profiles; seen in FIG. 11 as well. An inner container wall 3.2 is also shown, to which the guide grate 7 is secured. Disposed between the inner container wall 3.2 and the outer container wall 3.1 is an open space 3.0, having a width a5 which allows the control grates 9, 10 to execute their stroke $x_{A,B}$, or $x_{B,A}$ in the opposite direction. The perforations 16 for attaining gas permeability on the part of the control grates 9, 10 are shown particularly clearly in FIGS. 9 and 10.

FIG. 10 shows the right-hand end of the apparatus with an advantageous placement and cooperation of the control grates, the stationary grating and the guide grating. In this case the two control grates 9, 10 are each connected to a respective thrust bolt 18.1, 18.2, each of which is extended to the outside through the wall 3.1 by using gas-tight housing bushings 19 having suitable O-rings 20. This drive connection makes it possible to control the first and second control grates 9, 10 independently of one another, although, as mentioned above, the embodiment that is preferred because it is simpler, is the one in which the two control grates 9, 10 are rigidly coupled to one another.

Figure 11:
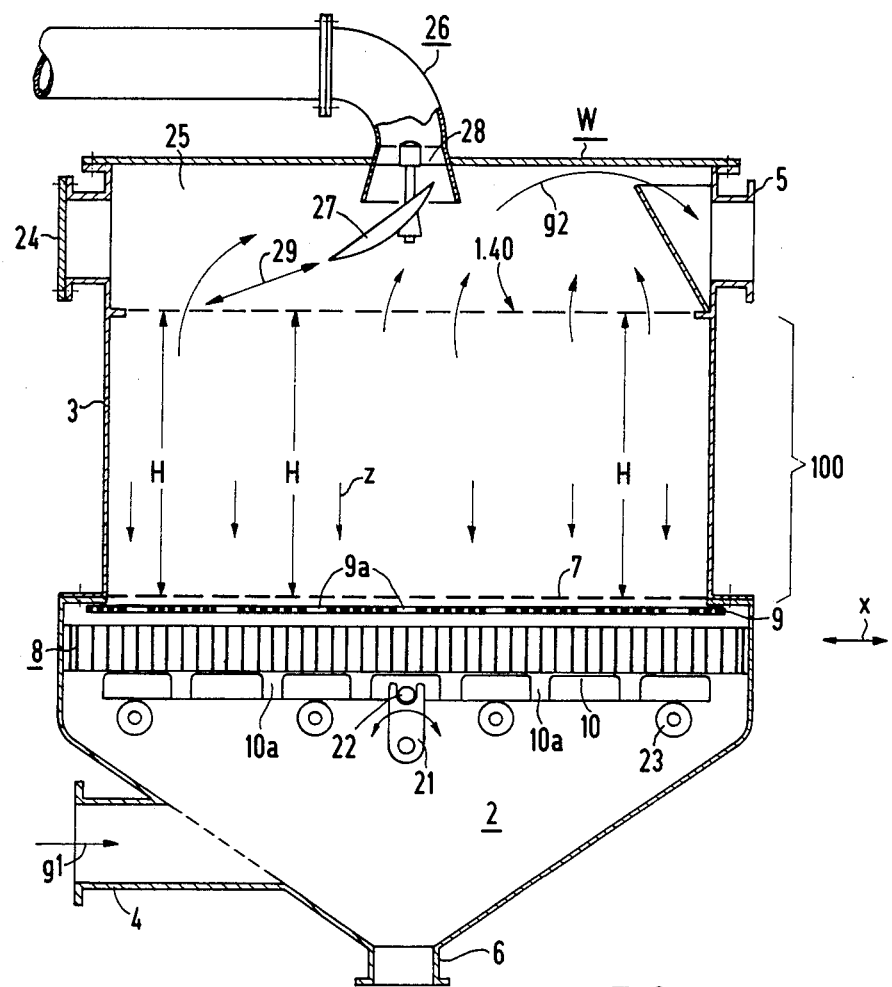
FIG. 11 is a highly simplified, overall cross-sectional view of the apparatus of FIGS. 9 and 10, with the entire container for the migrating-bed filter, including a filter material removal hopper disposed below the apparatus, a layer of bulk material, and an activated carbon filling device discharging above the layer of bulk material, but in which the drive of the control grates has been modified.
Figure 13:
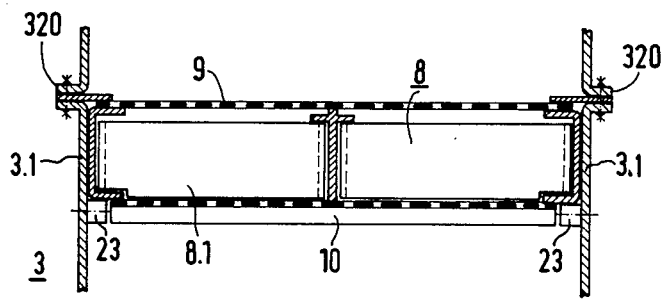
FIG. 13 is a fragmentary longitudinal-sectional view of the upper and lower control grates, which are built into the container and encompass the fixed grating.
Figure 12:
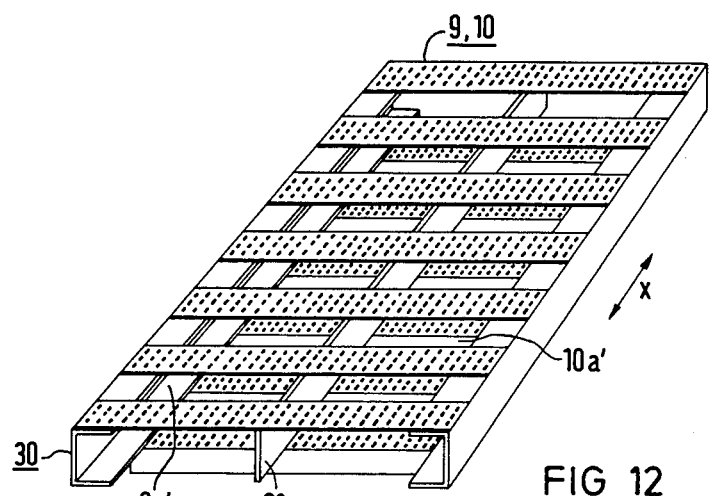
FIG. 12 is a perspective view of the upper and lower control grate.

FIG. 11 is a diagrammatic overall view and FIGS. 12–14 are diagrammatic detailed views showing the construction of the grating and control grates of FIGS. 9 and 10, but with the control grate drive having been modified somewhat FIG. 11 shows a drive crank 21 underneath the lower control grate 10, which with a crossbar 22 extending transverse to the stroke direction engages an oblong slot-like recess at the end of the crank. The lower or second control grate 10 is also rollingly supported in the stroke direction x at a row of bearing roller bodies 23 that is in alignment with the stroke direction. Otherwise, the same reference numerals and symbols used in FIG. 1 are again used for identical parts. The layer thickness H is uniform everywhere, as has already been seen in FIG. 1. In contrast to FIG. 1, an inspection port 24 is additionally shown in FIG. 11, which permits access to the space 25 above the bulk-material column 100 when a flanged lid is open. In order to distribute bulk material evenly over the entire surface area, the filling apparatus 26 is used. The filling apparatus 26 has a distributing blade 27 that is set into rotation by the air flow; the blade is rotatably supported on a star element 28 and distributes the arriving bulk material uniformly onto the top 1.40 of the layer, as indicated by an arrow 29.

FIG. 12 is a diagrammatic perspective view showing the first and second control grates 9, 10 in the version having slit-like passage openings 9a' and 10a' (see FIGS. 9 and 10), in which the second control grate 10 is assembled from mutually spaced apart U-profile beams (see FIG. 11), between which the passage openings or slits 10a' are formed. In the middle, between the two side walls of the control grate structure identified as a whole by reference numeral 30, there is a reinforcing rib 31, so that the weight of the deposits of bulk material, or the weight of the entire column, is shifted onto the structure 30 and the grating shown in perspective in FIG. 14. The grating of FIG. 14 is constructed of intersecting lattice bars 8.1, 8.2 in the form of an egg crate decking, but in the middle it has a longitudinal slit 32 oriented in the stroke direction x, that is, plane-parallel to the lengthwise lattice bars 8.2. The reinforcing rib 31 is seated in the longitudinal slit 32; that is, the structure 30 is movable back and forth in the stroke direction x and while doing so encompasses the stationary grating 8. The relationship of the grating 8 and the control grate structure 30 is apparent once again from the side view of FIG. 13. In FIG. 13, reference numeral 320 indicates housing flange connections of the container 3. The stationary grating 8 is firmly connected to the wall of the container 3 on the narrow sides of the container, in a non-illustrated manner.

Figure 15:
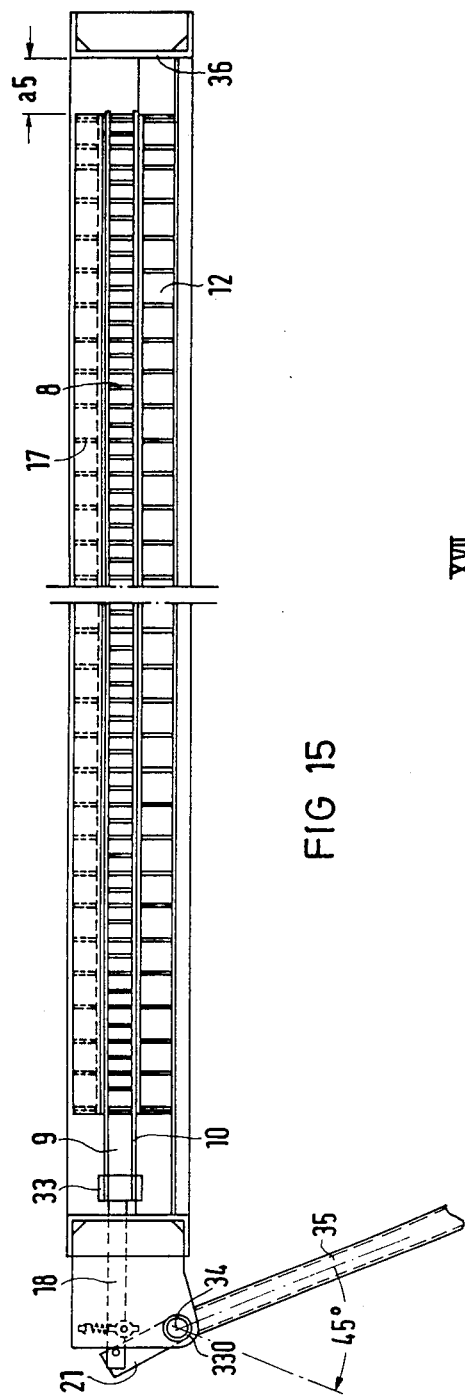
FIG. 15 is an elevational view of the entire structural layout of the apparatus of the embodiment of FIGS. 6–8.

FIG. 15 shows a version of the apparatus according to FIGS. 6–8 that is suitable for actual use. The upper guide grate 17, the lower supporting grate 12 and the stationary grating 8 therebetween is seen, with the first (upper) and the second (lower) control grates 9 and 10. The two control grates are connected by an anchoring element 33 to a thrust bolt 18, which passes in a sealed manner through the wall of the structural unit shown in FIG. 15 and is connected by the thrust crank 21 with an actuating rod 35. The crank 21 is seated on a shaft 34 which is supported at reference numeral 330. If the actuating rod 35 is pivoted clockwise through approximately 45 as shown, the two control grates 9, 10 execute a stroke up to a housing stop 36. In so doing, they move through the open space a5. When the actuating rod is moved counterclockwise, one complete back-and-forth stroke and hence one uniform trickling-down process for a defined partial amount of bulk material, has been executed.

Figure 16:
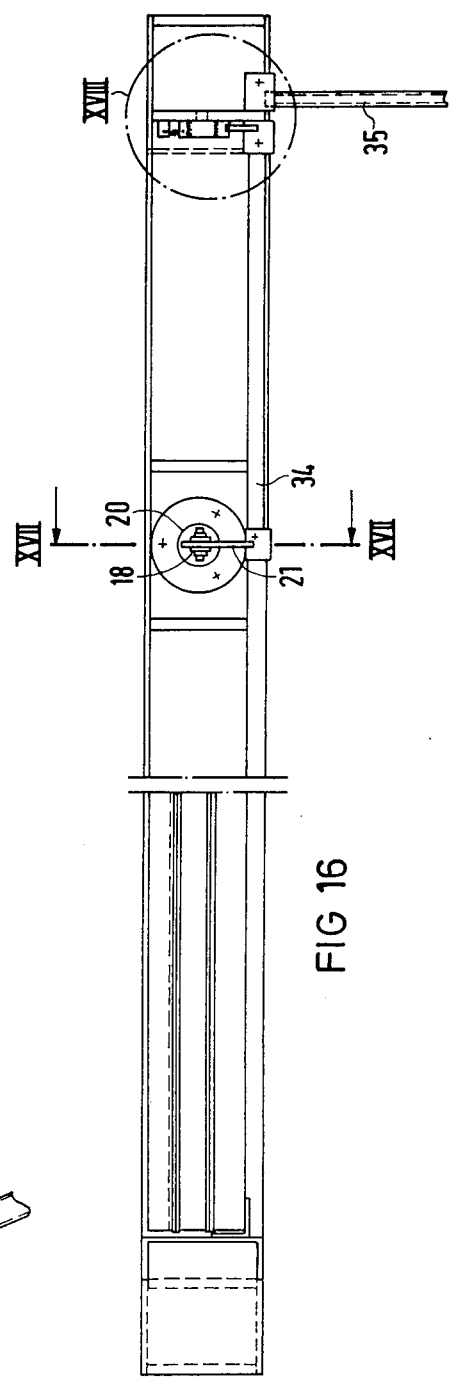
FIG. 16 is a fragmentary view of the end of the apparatus of FIG. 15 where the actuation rod is disposed.

FIG. 16 shows a view of the left-hand end of the apparatus of FIG. 15, with the shaft 34 and the thrust crank 21. The portion XVIII relates the alignment or setting stop 36, which will be explained later in conjunction with FIGS. 18 and 19.

Figure 17:
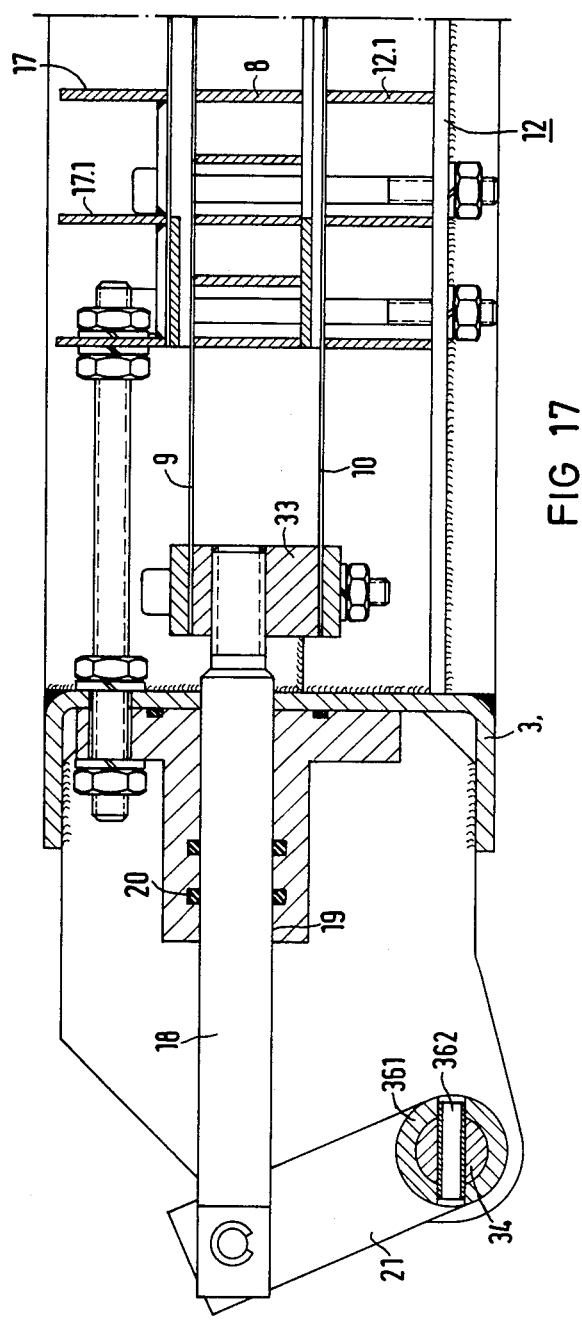
FIG. 17 is a cross-sectional view taken along the line XVII—XVII of FIG. 16, in the direction of the arrows, showing the connection of the control grates with a thrust bolt and its bearing.

Turning first to FIG. 17, it is seen that the thrust crank 21 is connected to the shaft 34 in a torque-proof manner (with a cotter pin 37 shown in FIGS. 18 and 19), through a bushing 361. The rigid connection of the guide grate 17 and of the supporting grate 12 with the housing wall 3.1 is seen as well.

The thrust bolt 18, which actually should be called a push-pull bolt, because when pushing the control grates it is under pressure and when pulling the control grates it is under tension, is only individually shown in FIG. 16; however, the shaft 34 does extend to the other half of the control grate structure 30, where a further thrust bolt bushing is attached to the wall in mirror symmetry. This construction is recommended for container shapes having relatively large longitudinal dimensions transverse to the stroke direction, or in other words where the grating and correspondingly the control grates are subdivided transverse to the stroke direction x, into at least two partial gratings or partial control grates. The actuation of the two double control grate halves is then carried out through one thrust bolt 18 for each half, and through the common shaft 34, by means of the actuation rod 35.

Figure 18:
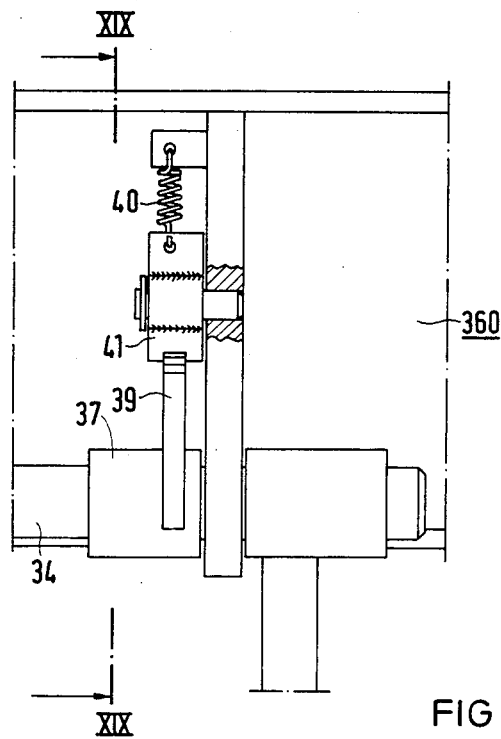
FIG. 18 is an enlarged view of a portion XVIII shown in FIG. 16, showing an alignment lock for a thrust crank.
Figure 19:
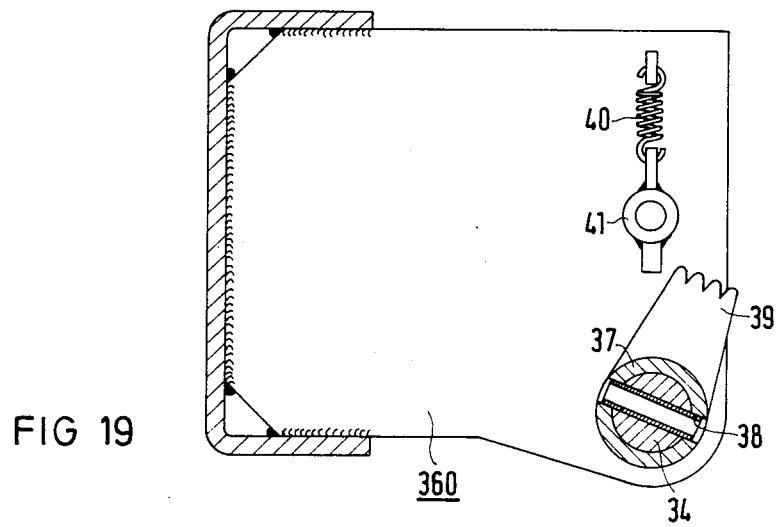
FIG. 19 is a cross-sectional view taken along the line XIX—XIX in FIG. 18 in the direction of the arrows, showing a plan view of the alignment lock.

FIGS. 18 and 19 also show that in order to assure a complete stroke with one back and forth movement for each of the double control grates 9, 10, a toothed segment 39 is connected in a torque-proof manner with the shaft 34 of the thrust crank 21 through a bushing 37 having the cotter pin 38; upon actuation of the rod 35, this toothed segment 39 meshes with a locking latch 41 loaded by a tension spring 40. The alignment lock formed by the elements 39, 41 only permits a complete pendulum movement of the actuating rod 35, so that in this way, the quantities of bulk material that are trickled down are always uniform.

In other words if the toothed segment 39 comes into engagement with the locking latch 41 upon moving counterclockwise, it pivots the latch clockwise, and when the shaft 34 continues to rotate, the locking latch 41 scrapes over the teeth and tooth gaps of the toothed segment 39 in succession until reaching its one end position; conversely, in the other rotational direction, it locks. If the toothed segment 39 is then rotated clockwise (the restoring direction) by means of the actuating rod 35 (shown in FIG. 15) and the shaft 34, then when the segment 39 engages the locking latch 41, it shifts the latch out of its illustrated center position, in the counterclockwise direction; as a result, further clockwise rotation of the toothed segment 39 is possible during the stroke and until the end of the stroke, but a reversal of direction on the other hand, is not possible. A reversal is prevented during both parts of the stroke, as long as the alignment lock 39,41 is engaged. Instead of or in addition to the actuating rod 35, a non-illustrated motor drive may also be used.

I claim:

1. Apparatus for the controlled removal of flowable bulk material (1) in as plane-parallel a manner as possible from the underside of a bulk-material column (100), comprising:
    a container (3) through which bulk-material deposits of the bulk-material column flow in a given flow direction (z), said container including means for conducting gaseous or vaporous media to be scrubbed through the bulk-material column substantially from bottom to top in a direction substantially opposite to said given direction for eliminating used filter material;
    a stationary grating (8) having a surface area being substantially the same as that of the bulk-material column and being disposed below and spaced from the underside of the bulk-material column (100), said grating including upper and lower surfaces and grid chambers (80) spaced apart by a given spacing in a horizontal sequence, said grid chambers being disposed in first and second groups;
    a first control grate (9) disposed on said upper surface of said grating (8) at a distance (a1) from the underside of the bulk-material column (100), said first control grating covering said surface area of said grating (8) and including alternating passage openings (9a) and blocking sections (9b) corresponding to said given spacing of said grid chambers, means for supporting said first control grate so as to be displaceable in a first horizontal stroke direction (x);
    a second control grate (10) disposed on said lower surface of said grating (8) and including passage openings (10a) and blocking sections (10b), means for supporting said second control grate so as to be displaceable axially parallel to said first horizontal stroke direction (x);
    and means for horizontally moving said passage openings and blocking sections of said first and second control grates (9, 10) for alternately:
    filling said first group (8a) of said grid chambers (80) of said grating (8) with bulk material (1) through said passage openings (9a) of said first control grate (9) and blocking said first group of said grid chambers with said blocking sections (10b) of said second control grate (10) preventing deposits (11) of bulk material therein from trickling down, and
    covering said second group (8b) of said grid chambers (80) following said first group (8a) of grid chambers (80) with said blocking sections (9b) of said first control grate (9) preventing said second group of grid chambers from receiving bulk material (1) and opening said second group of grid chambers with said passage openings (10a) of said second control grate (10) for emptying deposits (11) of bulk material therein.

2. Apparatus according to claim 1, wherein said container (3) is a migrating-bed filter.

3. Apparatus according to claim 1, including a supporting grate (12) supporting said second control grate (10) along with the deposits (11) of bulk material located thereon and guiding said second control grate (10) along with the deposits (11) of bulk material located thereon in said stroke direction (x).

4. Apparatus according to claim 1, wherein said first control grate (9) along with the bulk material (1) located thereon is supported on said stationary grating (8) and is guided thereon in said stroke direction (x).

5. Apparatus according to claim 1, including a guide grating (7) disposed below the underside of the bulk-material column (100) for at least partially supporting the bulk-material column (100) and reducing frictional forces between said first control grate (9), the underside of the bulk-material column and said grating (8) when said first control grate moves, said guide grating having first and second openings (7.1, 7.0) formed therein and distributed over the surface area of the bulk-material column (100) permitting the bulk material to trickle down and admitting the gaseous or vaporous media (g1) flowing in from below.

6. Apparatus according to claim 1, including a horizontal guide grate (17) disposed below the bulk-material column and having individual grate strips (17.1) standing on edge and protruding into the bulk-material column (100), for preventing transverse movement of particles (1) of the bulk-material column (100) frictionally bound to said first control grate (9) when said first control grate (9) moves.

7. Apparatus according to claim 1, wherein said passage openings (9a, 10a) in at least one of said control grates (9, 10) are slits (9a', 10a') extending transverse to said stroke direction (x).

8. Apparatus according to claim 1, wherein said passage openings in at least one of said control grates (9, 10) are in the form of rows of uniformly spaced and mutually aligned openings (9a, 10a; 9a1, 10a1), extending transverse to said stroke direction.

9. Apparatus according to claim 8, wherein said passage openings are round openings (9a1, 10a1).

10. Apparatus according to claim 8, wherein said passage openings are rectangular openings (9a1, 10a1).

11. Apparatus according to claims 1, including means for rigidly coupling, supporting and moving said first and second control grates (9, 10) back and forth in common in said horizontal stroke direction (x) as a double control grate, for are alternatingly filling successive grid chambers (80) of said first (8a1) and second (8b) groups with bulk material (1) from above and emptying successive grid chambers (80) of said first (8a) and second (8b) groups of bulk material from below upon a horizontal movement of said double control grate in said stroke direction.

12. Apparatus according to claim 1, wherein said control grates are movable into two end positions (A,B), said passage openings and said blocking sections have surface regions, and in each of said end positions (A,B) said blocking sections (9b) of said first control grate (9) are aligned with said surface regions of said passage openings (10a) of said second control grate (10), and said passage openings (9a) of said first control grate (9) are aligned with said surface regions of said blocking sections (10b) of said second control grate (10), as viewed in said given flow direction (z).

13. Apparatus according to claim 12 wherein said first control grate is an upper control grate; said second control grate is a lower control grate; said grid chambers of said groups are disposed in rows; each two of said rows of said grid chambers (80) of said second group (8b) which have been or are being emptied in one (A) of said end positions of said upper and lower control grate, (9, 10) being extended transverse to said stroke direction and being adjacent two of said rows of said grid chambers (80) of said first group (8a) which are full or are being filled in said one end position (A) of said upper and lower control grate (9, 10) and are extended transverse to said stroke direction (x), as viewed in said stroke direction (x); and said passage openings (9a) of said upper control grate (9) having back edges and a back-edge distance ($x_1$) equal to a partial stroke of said back edge (14) of one of said passage openings thereof from said one end position (A) until said one passage opening is covered; said passage openings (10a) of said lower control grate (10) having front edges and a front-edge distance ($x_2$) equal to a partial stroke of said front edge (15) of one of said passage openings thereof from said one end position (A) to a position in which said one passage opening is not quite opened yet; and said back-edge distance ($x_1$) being at most equal to said front-edge distance ($x_2$).

14. Apparatus according to claim 13, including at least one other row of intermediate grid chambers (8c) extending transverse to said stroke direction and following each first-mentioned row of grid chambers (80) of said first group (8a) which have been or are being filled in said one control grate end position (A) as viewed in said stroke direction (x); in said one end position (A) said at least one other row of intermediate grid chambers being covered above and below by said blocking sections (9b, 10b), and said at least one other row of intermediate grid chambers (8c) being followed by a further row of said grid chambers (80) of said second group (8b) which have been or are being emptied in said one control grate end position (A), and said further row of said grid chambers being followed by an additional row of grid chambers (80) of said first group (8a), and so forth.

15. Apparatus according to claim 11, wherein said container includes adjoining side walls, and said coupling, supporting and moving means include an anchoring element interconnecting said two control grates, said anchoring element having thrust bolts (18; 18.1, 18.2) passing sealingly through said adjoining side walls of said container (3) and a thrust crank (21) locked to said thrust bolts (18; 18.1, 18.2).

16. Apparatus according to claim 15, wherein said thrust crank includes a shaft, and including an actuating rod (35) connected in a torque-proof manner with said shaft (34) of said thrust crank (21).

17. Apparatus according to claim 16, including an alignment block (39, 41) engaging said shaft (34) of said thrust crank (21) and permitting only a complete pendulum movement of said actuating rod at a time, for assuring one complete back-and-forth stroke of said double control grate (9, 10) formed of said two control grates (9, 10).

18. Apparatus according to claim 16, wherein said grating (8) and correspondingly said control grates (9, 10) are respectively subdivided transverse to said stroke direction into at least two partial gratings and partial control gratings, said partial control gratings each have said thrust bolts and thrust cranks, and said shaft is a common actuating shaft (34) engaged by said actuating rod (35) and coupling said thrust cranks, when said container has surface areas with relatively large longitudinal dimensions transverse to said stroke direction (x).

* * * * *